(12) United States Patent
Gillette

(10) Patent No.: US 7,007,402 B1
(45) Date of Patent: Mar. 7, 2006

(54) SYSTEM AND METHOD FOR DRYING PARTICULATE MATERIALS USING HEATED GAS

(75) Inventor: W. John Gillette, Millersville, MD (US)

(73) Assignee: Novatec, Inc., Baltimore, MD (US)

( * ) Notice: Subject to any disclaimer, the term of this patent is extended or adjusted under 35 U.S.C. 154(b) by 0 days.

(21) Appl. No.: 10/967,149

(22) Filed: Oct. 19, 2004

(51) Int. Cl.
*F26B 21/06* (2006.01)

(52) U.S. Cl. .............................. 34/80; 34/169; 34/472; 34/504; 34/219

(58) Field of Classification Search .................... 34/80, 34/168, 137, 169, 472, 473, 474, 345, 376, 34/377, 378, 379, 477, 504, 566, 570, 77, 34/81, 219
See application file for complete search history.

(56) References Cited

U.S. PATENT DOCUMENTS

| | | | | |
|---|---|---|---|---|
| 1,069,241 A | * | 8/1913 | Erlwein | 261/136 |
| 3,314,159 A | * | 4/1967 | Betz | 34/72 |
| 3,574,953 A | * | 4/1971 | Furnell | 34/219 |
| 4,031,593 A | | 6/1977 | Vandergriff | 19/27 |
| 4,251,925 A | | 2/1981 | Muhsil et al. | 34/48 |
| 4,325,192 A | | 4/1982 | Larsen et al. | 34/80 |
| 4,337,584 A | | 7/1982 | Johnson | 34/65 |
| 4,870,760 A | | 10/1989 | Gräff | 34/32 |
| 4,974,336 A | | 12/1990 | Hahn | 34/22 |
| 5,111,596 A | * | 5/1992 | Laurenty | 34/578 |
| 5,440,823 A | | 8/1995 | Willgohs | 34/363 |
| 5,566,468 A | * | 10/1996 | Graeff | 34/80 |
| 5,915,816 A | * | 6/1999 | Graff | 34/378 |
| 6,289,606 B1 | | 9/2001 | Gillette et al. | 34/472 |
| 6,321,461 B1 | | 11/2001 | Ogasahara | 34/169 |
| 6,370,797 B1 | | 4/2002 | Crawford | 34/475 |
| 6,584,701 B1 | | 7/2003 | Brown et al. | 34/169 |
| 2002/0038521 A1 | | 4/2002 | Speck | 34/474 |

* cited by examiner

*Primary Examiner*—Kenneth Rinehart
(74) *Attorney, Agent, or Firm*—Miles & Stockbridge

(57) ABSTRACT

A system and method for drying particulate material in a dual flow hopper employs multiple flow paths by which heated gas is inserted into the hopper at different levels. Gas is extracted from the hopper and is divided for flow along two flow paths, one of the flow paths receiving gas that has been dried and the other flow path receiving gas that has not been dried.

15 Claims, 3 Drawing Sheets

SYSTEM AND METHOD FOR DRYING PARTICULATE MATERIALS USING HEATED GAS

BACKGROUND OF THE INVENTION

This invention is concerned with drying solid bulk materials, such as plastic pellets, powders or other particulates.

Commonly owned U.S. Pat. No. 6,289,606 issued Sep. 18, 2001 and U.S. Pat. No. 6,584,701 issued Jul. 1, 2003 disclose systems and methods for drying particulate material in a hopper using heated gas, both patents being incorporated herein by reference.

In U.S. Pat. No. 6,289,606, dehumidified air from a dessicant bed is supplied to a hopper and is returned from the hopper to the dessicant bed. When the dew point of the return air drops to a pre-set level, a diverter causes the return air flow to bypass the dessicant bed and to be re-supplied to a hopper without dehumidification.

In U.S. Pat. No. 6,584,701, air from a compressed air inlet flows through a membrane dryer and a heater and is supplied to a lower portion of a dual flow hopper. Another portion of the air from the inlet is mixed with air extracted from the hopper. The mixed air flows through a heater and is supplied to a higher portion of the hopper.

BRIEF DESCRIPTION OF THE INVENTION

The present invention takes advantage of a dual flow hopper having inlet ports at two different levels, without requiring a source of compressed air, a membrane dryer, or an air mixer. Gas extracted from the hopper is divided into two parts, a first part being returned to the hopper along a first flow path after being passed through a dryer, a second part being returned to the hopper along a second flow path without being passed through a dryer. By virtue of the fact that only part of the gas extracted from the hopper passes through the dryer, a smaller dryer can be used, which lowers the initial equipment cost, saves floor space, and reduces the energy required compared to a larger dryer.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
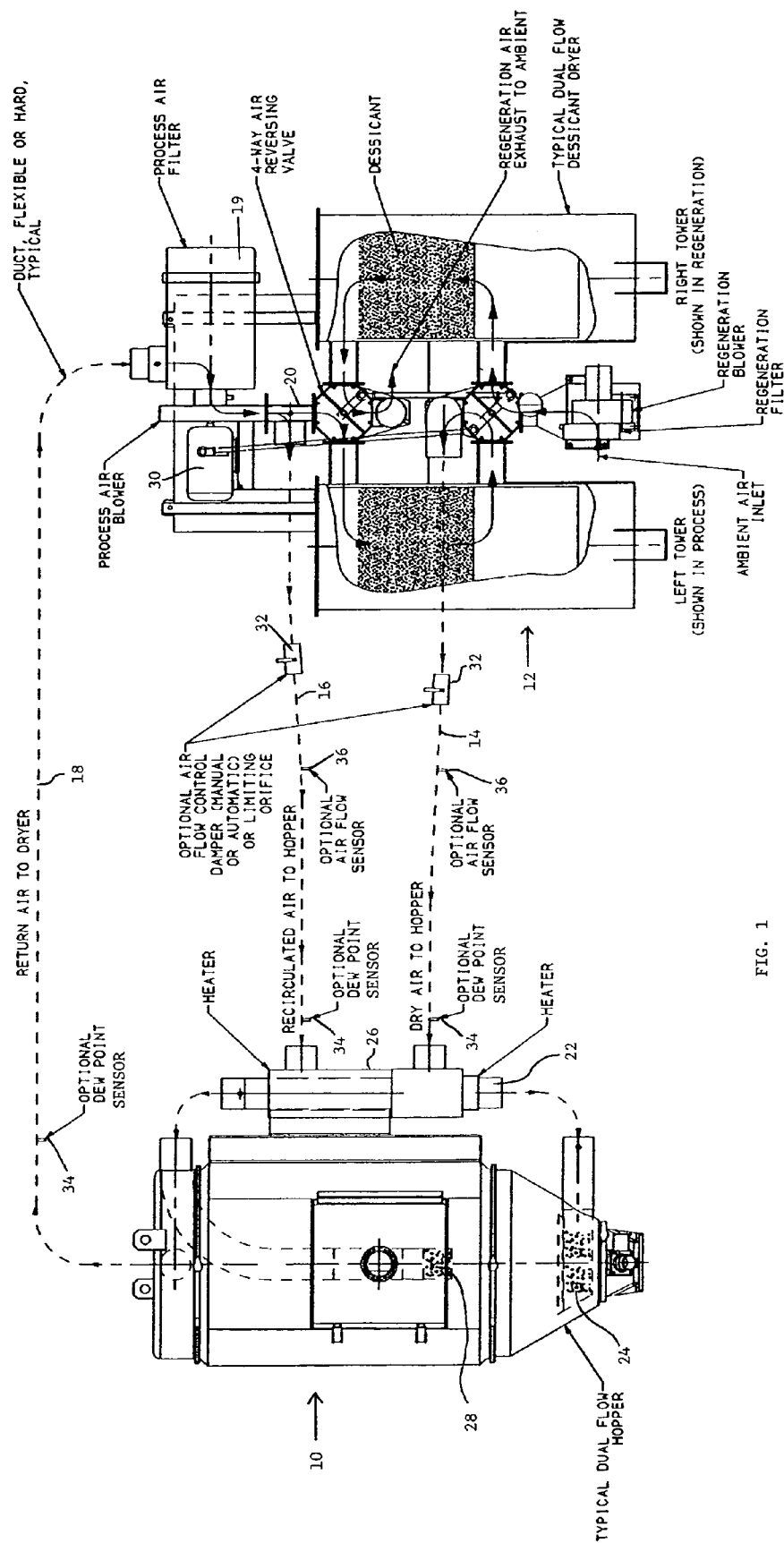
FIG. 1 is a diagrammatic side view of a system in accordance with the invention.
Figure 2:
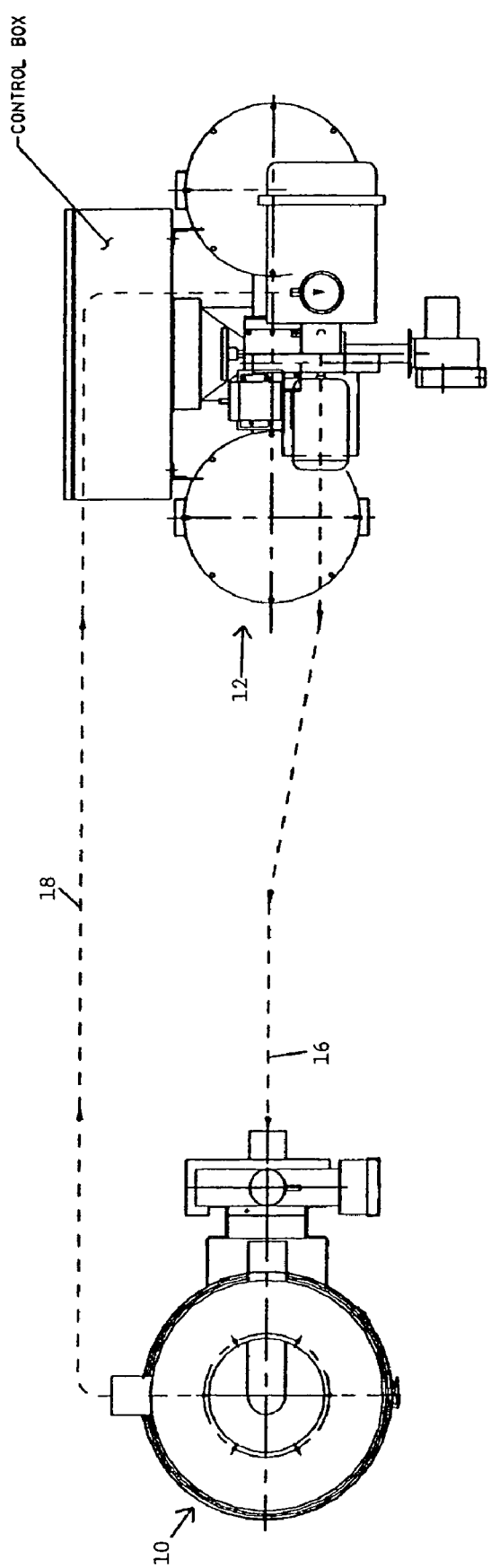
FIG. 2 is a diagrammatic top view of the system of FIG. 1.
Figure 3:
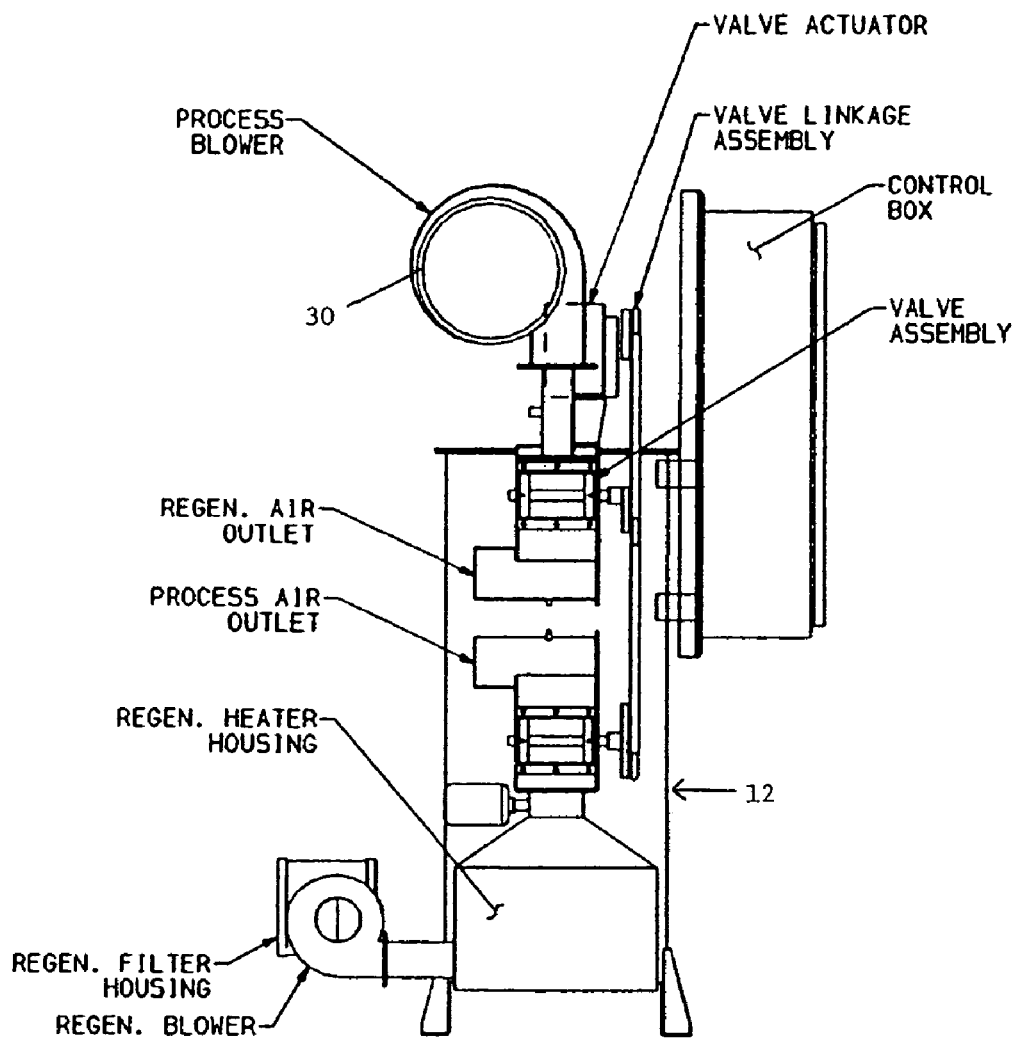
FIG. 3 is a diagrammatic end view of a portion of the system.

As shown in FIG. 1, a drying system in accordance with the invention includes a chamber 10 containing material to be dried and a dryer 12. The chamber 10 is preferably a dual flow hopper of the type described in the aforesaid U.S. Pat. No. 6,584,701, in which material to be dried flows downwardly from the top of the hopper and exits the hopper at the bottom, while drying gas (e.g., air, nitrogen or other gas) supplied to the hopper through ports at different levels flows upwardly and is extracted from the hopper for recirculation to the hopper. The dryer is preferably a dual tower dessicant dryer, such as that described in the aforesaid U.S. Pat. No. 6,289,606, with valves that adjust process gas flow so that one of the towers can be in use while the other is being regenerated.

The system of the invention is a closed loop system that includes three process flow paths 14, 16, 18. Gas extracted from the hopper flows along the third flow path 18 and through a process filter 19 to a splitter 20 that divides the extracted gas into a first part and a second part for flow along the first and second flow paths 14 and 16, respectively. Gas flow along the first flow path 14 is passed through a heater 22 and is inserted into a lower portion of the hopper via a diffuser 24. Gas flow along the second flow path 16 is passed through a heater 26 and is inserted into a higher portion of the hopper via a diffuser 28. From the splitter 20, the gas to flow along the first flow path 14 passes through the dryer 12. Gas from the splitter to the second flow path 16 does not pass through the dryer, and is returned to the hopper. A process blower 30 provides the gas flow along all three flow paths.

In operation of the system of the invention, gas laden with moisture from the material in the hopper 10 returns to the dessicant dryer 12 along the third flow path 18, passes through the process filter 19, and is circulated through the system by the process blower 30. Part of the moisture-laden gas from the process blower recirculates directly back to the hopper along flow path 16 where it is heated by the heater 26 to a selected drying temperature before entering the hopper through an upper port. This gas stream heats material in the upper portion of the hopper while surrounding the material with gas that is generally drier than ambient, but not extremely dry.

Another part of the gas extracted from the hopper passes through the dessicant dryer 12. Moisture is removed from this gas stream, which returns to the hopper along the first flow path 14, where it is heated by the heater 22 to a required drying temperature before entering the hopper through a lower port. This very dry gas heats material in the lower portion of the hopper while it surrounds the material with a gas that is sufficiently dry for the material to reach its final moisture equilibrium content.

The system of the invention can be enhanced with optional gas flow controllers 32, using dampers, for example, which may be either manually or automatically controlled, or using orifices, to limit the amount of gas returned to the hopper along the first and second flow paths.

In a fully automatic system, dew point sensors 34 can measure the dew point of the gas flow along each of the flow paths, and air flow sensors 36 can measure the air flow along flow paths 14 and 16. The flow controllers 32 can then be set in response to the measured dew points and air flows to maximize drying while minimizing energy requirements. The controls can be used to determine the portion of dry gas required in flow path 14 compared to the recirculated gas in flow path 16 to achieve the desired dryness without overdrying, while minimizing the amount of energy used. Certain features of the dryer 12 are designated in the drawings by appropriate legends and are further described in the aforesaid U.S. Pat. No. 6,289,606.

While preferred embodiments of the invention have been shown and described, it will be apparent that changes can be made without departing from the principles and spirit of the invention, the scope of which is defined in the following claims.

What is claimed is:

1. A system for drying particulate material, comprising:
   a chamber for the material to be dried;
   a first flow path by which heated gas is inserted into the chamber at a first level;

a second flow path by which heated gas is inserted into the chamber at a second level;

a third flow path by which gas is extracted from the chamber;

a dryer; and a splitter that directs part of the gas in the third flow path to the first flow path after passing through the dryer and that directs another part of the gas in the third flow path to the second flow path without passing through the dryer.

2. A system according to claim 1, wherein the chamber is a dual flow hopper with flow of the material to be dried in one direction and flow of drying gas in another direction.

3. A system according to claim 2, wherein each of the first and second flow paths includes a heater that heats gas to be inserted into the hopper to a selected drying temperature, heated gas in the second flow path is inserted into an upper portion of the hopper to surround material in the hopper with gas that is drier than ambient, and heated gas in the first flow path is inserted into a lower portion of the hopper to surround material in the hopper with gas that is substantially drier than the heated gas inserted from the second flow path, whereby material in the hopper can reach a prescribed moisture content before exiting the hopper.

4. A system according to claim 3, wherein the heaters are adjacent to the hopper, and a blower is provided adjacent to the dryer for providing closed-loop gas flow along the flow paths.

5. A system according to claim 1, wherein the third flow path receives gas from the hopper at a higher level than the first and second levels.

6. A system according to claim 1, wherein the dryer is a dessicant dryer.

7. A system according to claim 1, wherein the splitter is located adjacent to the dryer.

8. A system according to claim 1, wherein the first and second flow paths include flow controllers.

9. A system according to claim 8, wherein at least one of the flow paths includes a moisture content sensor for adjusting a flow controller.

10. A method of drying particulate material in a chamber comprising:

supplying heated gas to the chamber along a first flow path;

supplying heated gas to the chamber along a second flow path; and drying gas supplied along the first flow path, gas supplied along the second flow path being undried, wherein the gas supplied along the first and second flow paths is obtained by extracting gas from the chamber and dividing the extracted gas for flow along the first and second flow paths, respectively.

11. A method according to claim 10, wherein the chamber is a dual flow hopper in which material flows through the hopper in one direction and gas flows through the hopper in another direction.

12. A method according to claim 11, wherein the gas supplied along the first flow path enters the hopper at a first level and the gas supplied along the second flow path enters the hopper at a second level.

13. A method according to claim 12, wherein the first level is lower than the second level.

14. A method according to claim 13, wherein the gas supplied along the second flow path surrounds material in the hopper with a gas that is drier than ambient and the gas supplied along the first flow path surrounds material in the hopper with a gas that is drier than the gas supplied along the second flow path and is sufficiently dry for the material to reach a prescribed moisture content.

15. A method according to claim 10, wherein the flow paths form a closed-loop gas flow system.

* * * * *